United States Patent
Iizuka

(10) Patent No.: US 9,584,693 B2
(45) Date of Patent: Feb. 28, 2017

(54) MEMORY CONTROL FOR POWER SAVING STATE BASED ON DETERMINATION OF VOLATILE MEMORY OR NON-VOLATILE MEMORY

(71) Applicant: CANON KABUSHIKI KAISHA, Tokyo (JP)

(72) Inventor: Toshiaki Iizuka, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/519,411

(22) Filed: Oct. 21, 2014

(65) Prior Publication Data

US 2015/0124279 A1    May 7, 2015

(30) Foreign Application Priority Data

Nov. 7, 2013   (JP) .................................. 2013-231437

(51) Int. Cl.
| | | |
|---|---|---|
| H04N 1/21 | (2006.01) | |
| G06K 15/00 | (2006.01) | |
| G06F 9/44 | (2006.01) | |
| G06F 1/32 | (2006.01) | |
| G06F 21/64 | (2013.01) | |
| G06F 21/60 | (2013.01) | |

(52) U.S. Cl.
CPC .......... *H04N 1/2104* (2013.01); *G06F 1/3284* (2013.01); *G06F 1/3287* (2013.01); *G06F 9/4418* (2013.01); *G06F 21/608* (2013.01); *G06F 21/64* (2013.01); *G06K 15/4055* (2013.01); *G06F 2221/2143* (2013.01); *G06K 15/408* (2013.01); *G06K 15/4095* (2013.01); *H04N 2201/0094* (2013.01); *H04N 2201/218* (2013.01); *Y02B 60/1267* (2013.01); *Y02B 60/1282* (2013.01)

(58) Field of Classification Search
None
See application file for complete search history.

(56) References Cited

U.S. PATENT DOCUMENTS

| 8,797,587 B2 | 8/2014 | Takeichi | |
|---|---|---|---|
| 2007/0026843 A1* | 2/2007 | Choi ..................... | H04W 12/06 455/411 |
| 2007/0148948 A1* | 6/2007 | Tanaka ......................... | 438/602 |

(Continued)

FOREIGN PATENT DOCUMENTS

JP    2012-098788 A    5/2012

OTHER PUBLICATIONS

U.S. Appl. No. 14/479,062, filed Sep. 5, 2014. Applicant: Toshiaki Iizuka.

*Primary Examiner* — Benny Q Tieu
*Assistant Examiner* — Haris Sabah
(74) *Attorney, Agent, or Firm* — Fitzpatrick, Cella, Harper & Scinto

(57) ABSTRACT

An image forming apparatus, having a main controller for controlling access to a main memory, and a method of controlling the apparatus, determine whether the main memory is a non-volatile memory or a volatile memory, and store the result of the determination in non-volatile memory, and, erasing data stored in the main memory when transition is made to a power off state or a sleep mode when it is determined that the main memory is a non-volatile memory.

9 Claims, 6 Drawing Sheets

(56) References Cited

U.S. PATENT DOCUMENTS

| | | | |
|---|---|---|---|
| 2007/0250547 A1* | 10/2007 | Kai et al. ...................... | 707/202 |
| 2009/0201558 A1* | 8/2009 | Kida ............................. | 358/404 |
| 2009/0235102 A1* | 9/2009 | Koshika ............ | G03G 15/5004 |
| | | | 713/324 |
| 2010/0071077 A1* | 3/2010 | Morris et al. ................... | 726/36 |
| 2013/0111244 A1* | 5/2013 | Yokomizo .................... | 713/323 |
| 2013/0301074 A1* | 11/2013 | Yamamoto ......... | H04N 1/00891 |
| | | | 358/1.14 |

* cited by examiner

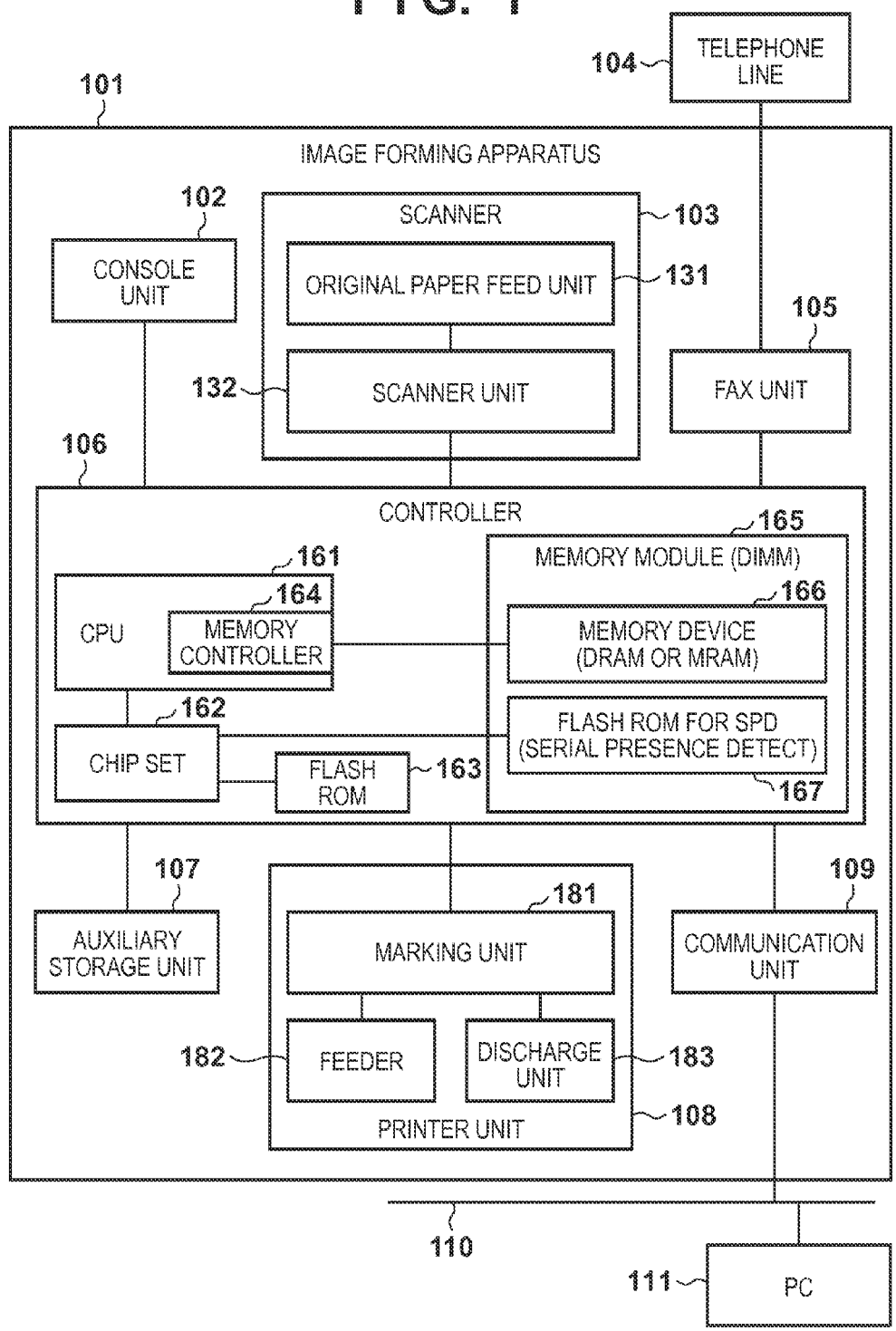

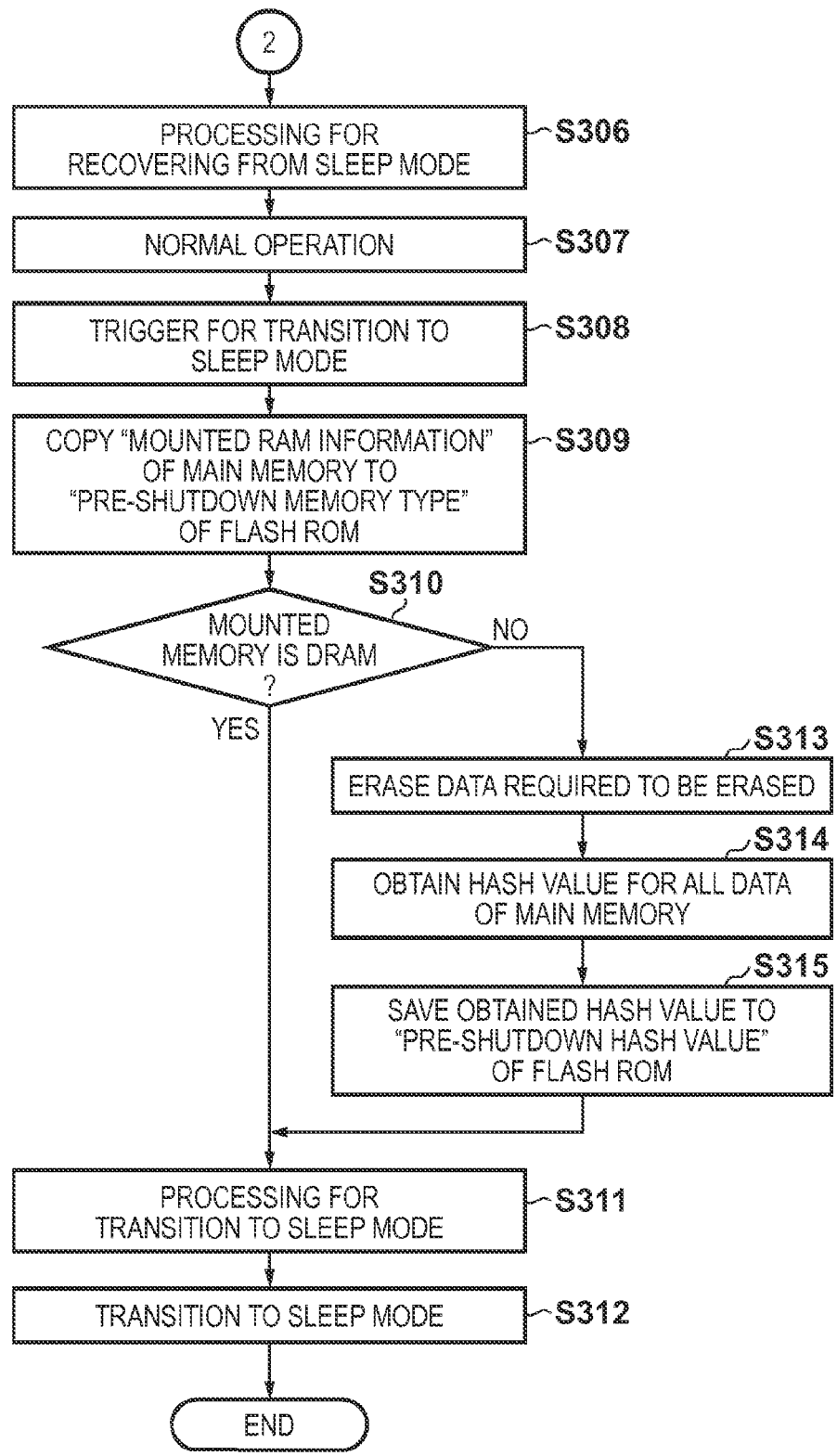

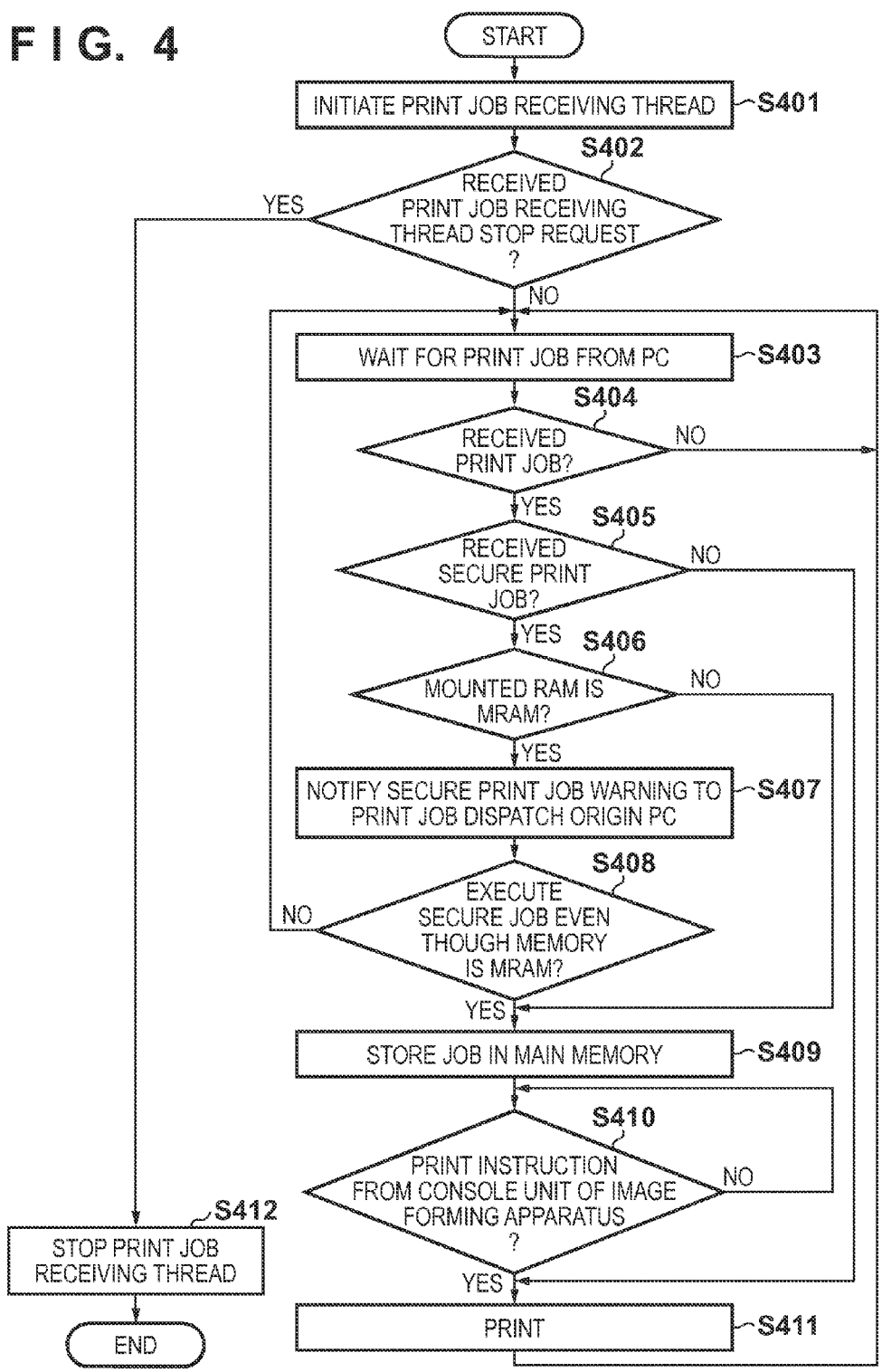

MEMORY CONTROL FOR POWER SAVING STATE BASED ON DETERMINATION OF VOLATILE MEMORY OR NON-VOLATILE MEMORY

BACKGROUND OF THE INVENTION

Field of the Invention

The present invention relates to an image forming apparatus, a method of controlling the same, and a storage medium.

Description of the Related Art

In general, in data processing apparatuses such as personal computers, DRAM (dynamic random access memory) is used as a main memory. Because this DRAM is a volatile memory, a power-supply configuration for holding stored data is necessary, and so manufacturing process miniaturization is more difficult than for non-volatile memory which does not necessarily require a power-supply configuration. For this reason, people are searching for ways in which to replace DRAM with non-volatile memory such as MRAM (a magnetoresistive memory) to break through limitations on manufacturing process miniaturization, and mount even larger capacity memory.

When changing from a volatile memory to a non-volatile memory, there is a need for a circuit arrangement in which both volatile memory and non-volatile memory can be mounted in the same configuration. For example, it is advantageous to manufacture an MRAM to have a package that is identical in shape to a package configuration (the size of a chip, the number of terminals equipped on a chip, the positioning of each terminal, the role of each terminal) of a DRAM chip. Also, in data processing apparatuses such as PCs, or the like, when DRAM is equipped, a connector for which a terminal arrangement is standardized such as for example a DIMM (Dual Inline Memory Module) slot is provided. Accordingly, if configuration is taken such that it is possible to mount an MRAM on a DIMM slot, it becomes possible to change a main memory from the DRAM to MRAM memory easily in a user environment.

In the field of image forming apparatuses, often a volatile memory that uses the same connector is mounted as a main memory in the same package as something standardized that is used as a main memory of a data processing apparatus such as a PC, or the like. This is because it is more possible to achieve a cost reduction by using a memory with a package and connector common to a generic data processing apparatus than when a package and a connector that are specialized for an image forming apparatus are employed. In Japanese Patent Laid-Open No. 2012-98788, a printer apparatus that performs an error check on a memory connected to a connector is described.

In such an image forming apparatus, when a non-volatile memory, which is mountable to a DIMM slot as described above, is used as a main memory the following kinds of problems arise. For example, there is the possibility that important information that is stored in a memory will leak due to content of the memories being read after a third party disconnects the memory from the connector in a state in which the power supply of the image forming apparatus is turned off. There is also the possibility that processing that the image forming apparatus executes will be changed due to a third party, having malice intent, replacing the program stored in the main memory with another executable program.

SUMMARY OF THE INVENTION

An aspect of the present invention is to eliminate the above-mentioned problems with the conventional techniques.

A feature of the present invention is to provide a technique in which security of data is maintained in a state in which a power supply of an apparatus is turned off, or in a sleep mode, if, when it is distinguished whether the main memory is a volatile memory or a non-volatile memory, the main memory is found to be the non-volatile memory.

According to an aspect of the present invention, there is provided an image forming apparatus having a main controller for controlling an access to a main memory, the image forming apparatus comprising a determination unit configured to determine whether the main memory is a non-volatile memory or a volatile memory, a storage unit configured to store a result of the determination by the determination unit in a non-volatile manner, and an erasing unit configured to erase data stored in the main memory when transition is made to a power off state or a sleep mode when the determination unit determines the main memory is the non-volatile memory.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a block diagram for explaining a configuration of an image forming apparatus according to a first embodiment of the present invention.

FIGS. 3A and 3B are flowcharts for describing processing in a case where the image forming apparatus recovers from a sleep mode and also when the image forming apparatus transitions into the sleep mode according to a second embodiment of the present invention.

FIG. 4 is a flowchart for describing processing of the image forming apparatus according to a third embodiment of the present invention.

DESCRIPTION OF THE EMBODIMENTS

Figure 2A:
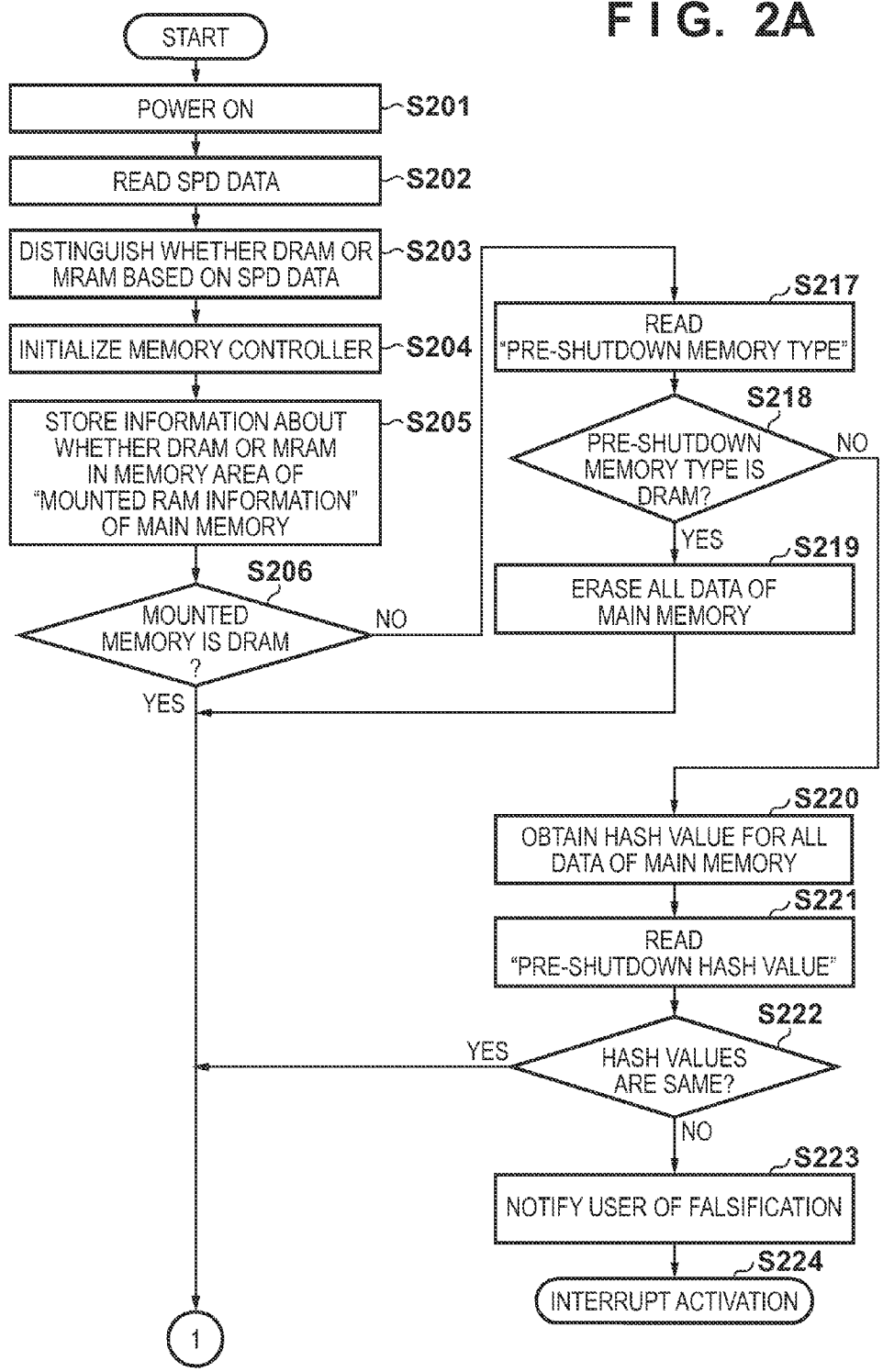
FIGS. 2A and 2B are flowcharts for describing processing in the image forming apparatus starting in a power on state to a power off state according to the first embodiment.

Embodiments of the present invention will be described hereinafter in detail, with reference to the accompanying drawings. It is to be understood that the following embodiments are not intended to limit the scope of the claims of the present invention, and that not all of the combinations of the aspects that are described according to the following embodiments are necessarily required with respect to the means to solve the problems according to the present invention.

[First Embodiment]

FIG. 1 is a block diagram for explaining a configuration of an image forming apparatus 101 according to a first embodiment of the present invention.

The image forming apparatus 101 comprises a console unit 102, a scanner 103, a facsimile (FAX) unit 105, a controller (main controller) 106, an auxiliary storage unit 107, a printer unit 108, and a communication unit 109. The console unit 102 has a display unit equipped with a touch panel function, hard keys, or the like, and receives operation of a user, and displays messages, or the like, to the user. The scanner 103 is equipped with a scanner unit 132 for optically scanning an image of an original, and outputting digital image data, and an original paper feed unit 131 for feeding originals to the scanner unit 132. The facsimile unit 105 transmits and receives facsimile signals to and from a telephone line 104. The auxiliary storage unit 107 stores digital image data, control programs, or the like. The printer unit 108 is equipped with a marking unit 181 for printing an image on paper (a sheet) based on digital image data, a feeder 182 for feeding a sheet to the marking unit 181, and a discharge unit 183 for discharging a sheet that is already printed. The communication unit 109 communicates with a personal computer (PC) 111 via a network 110, and receives print jobs from the PC 111, for example. The main controller 106 controls the connected scanner 103, facsimile unit 105, auxiliary storage unit 107, and printer unit 108 respectively. Also, the main controller 106 controls print processing in accordance with a print job that the communication unit 109 receives.

The main controller 106 has a CPU 161, a chip set 162 which is responsible for control of an interface with a peripheral circuit, a non-volatile flash ROM 163 which holds basic data such as a boot program, activation settings and the like, and a memory controller 164. Also, a memory module 165 is mounted in a DIMM slot as a main memory. To the memory module 165, a memory device 166, which is a main memory, and a flash ROM 167 for SPD (Serial Presence Detect), which holds information indicating the type of a memory mounted to the memory module 165, are mounted. Access from the CPU 161 to the memory device 166, i.e. data read and write control, is performed via the memory controller 164. Also, the CPU 161, separately from the memory controller 164, is able to read out information indicating the type of the memory from the flash ROM for SPD 167 via a chip set 162.

Note that FIG. 1 is only a functional block diagram, and though many hardware elements such as a clock generator, for example, are included in the main controller 106, these are omitted because they are not important to the explanation of the first embodiment.

Figure 2B:
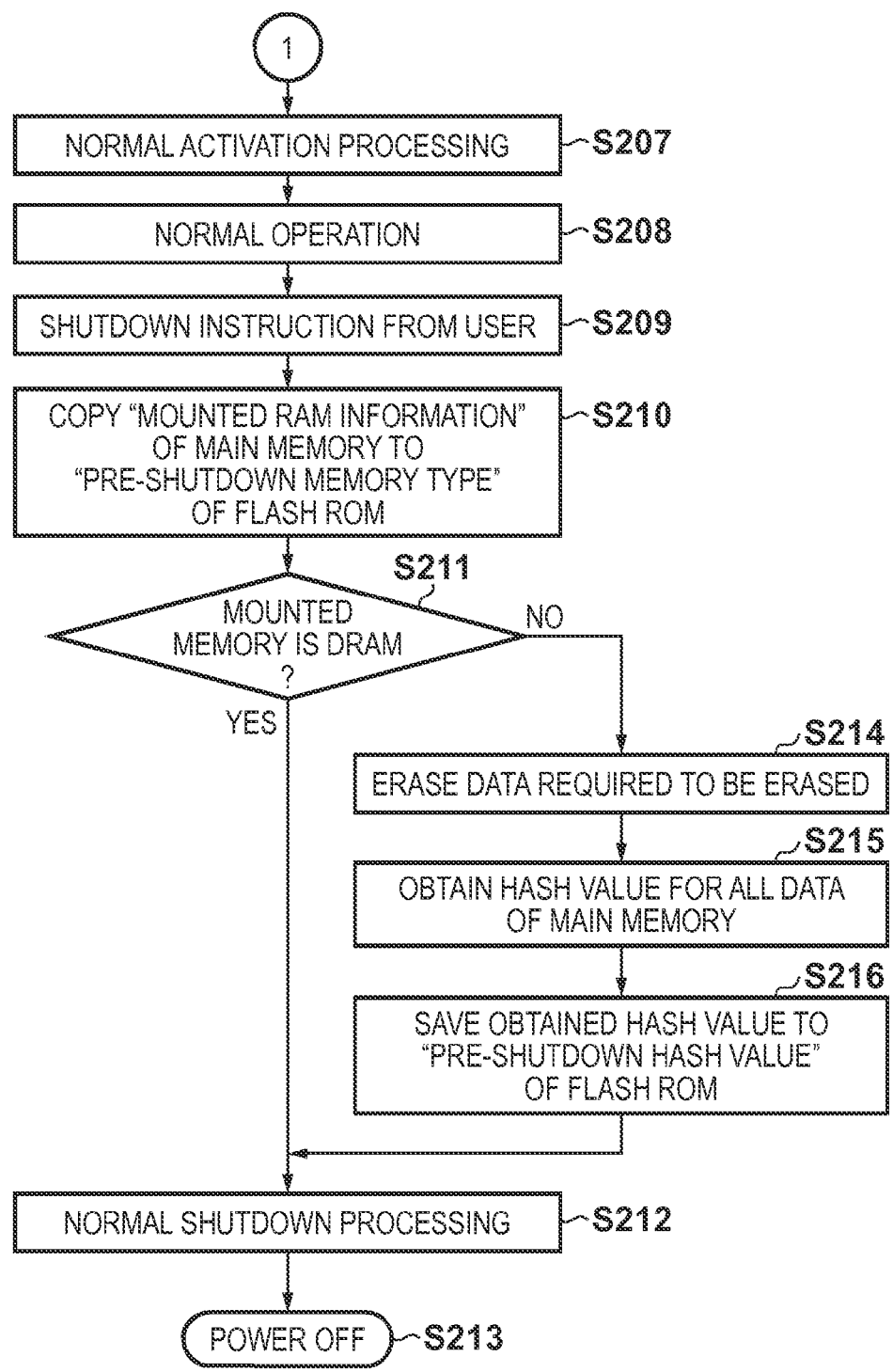

FIGS. 2A and 2B are flowcharts for describing processing in the image forming apparatus 101 from a powering on to a powering off according to the first embodiment. Note that a program for executing this processing is stored in the auxiliary storage unit 107, loaded into the memory device 166 by the boot program upon execution, and executed under the control of the CPU 161.

This processing is initiated by the power supply of the image forming apparatus 101 being activated in step S201, and the CPU 161 reads in SPD data from the flash ROM for SPD 167 in step S202. Next, based on the SPD data read in, the CPU 161 distinguishes whether a mounted memory device 166 is a DRAM or a non-volatile memory such as an MRAM in step S203. Next the processing proceeds to step S204 and the CPU 161 initializes the memory controller 164 based on the SPD data. It becomes possible to use the memory device 166 as a main memory by the initialization. Next the processing proceeds to step S205 and the CPU 161 stores the information, representing whether the mounted memory device 166 is the DRAM or the non-volatile memory such as the MRAM, in a memory area of "mounted RAM information" of the main memory.

Next the processing proceeds to step S206 and the CPU 161 determines whether or not the mounted memory device 166 is the volatile memory such as the DRAM, and if it is not the processing proceeds to step S217, but if the mounted memory device 166 is the DRAM, the processing proceeds to step S207. The CPU 161 performs normal activation processing in step S207, and the CPU 161 transitions to normal operation in step S208. Next, if the CPU 161 receives the shutdown instruction from a user in step S209, the processing proceeds to step S210 and the CPU 161 copies the information saved in the memory area of "the mounted RAM information" of the main memory to an area of "a pre-shutdown memory type" of the flash ROM 163.

Next the CPU 161 determines whether or not the mounted memory device 166 is the DRAM in step S211, and if the mounted memory device 166 is the DRAM the processing proceeds to step S212, the CPU 161 performs a normal shutdown processing and turns off the power supply in step S213, the processing completes. In this way if the main memory is comprised of a volatile memory such as the DRAM, shutdown processing similar to that of a conventional apparatus is executed.

On the other hand, if the CPU 161 determines that the mounted memory device 166 is not the DRAM but rather the non-volatile memory in step S211, the processing proceeds to step S214 and the CPU 161 erases the data stored in the main memory that is required to be erased. Next the processing proceeds to step S215, the CPU 161 obtains a hash value for all of the data of the main memory, and the CPU 161 stores the obtained hash value to the area of "a pre-shutdown hash value" of the flash ROM 163 in step S216. Then the processing proceeds to step S212, the normal shutdown processing is performed and the processing completes. Note that the data for which it is determined that the erasure is required in step S214 includes for example personal information data, facsimile data received by the facsimile unit 105 via the telephone line 104, data received from the PC 111 via the network 110, or the like.

In this way, in a case where the main memory is a non-volatile memory, before a shutdown is executed, the data on the main memory, that must not be leaked to an external unit and thus should be erased, is erased. With this, if content of the main memory is read when the power supply is in an OFF state, important information will not be leaked.

On the other hand, if the CPU 161 determines that the memory device 166 is the non-volatile memory such as the MRAM in step S206, the processing proceeds to step S217 and the CPU 161 reads in the information of "the pre-shutdown memory type" of the flash ROM 163. Then the processing proceeds to step S218, and if the CPU 161 determines that the pre-shutdown memory type is the volatile memory such as the DRAM, the processing proceeds to step S219 and the CPU 161 erases all of the data stored in the main memory, the processing proceeds to step S207 and normal activation processing is performed. This is because if the pre-shutdown main memory is the volatile memory, there is no problem even if all of the information stored in the memory is erased. Note that, instead of erasing all of the data unconditionally in step S219, configuration may be taken so as to display in order to prompt a user to make a selection of whether or not to erase the data, and to only erase all of the data stored in the main memory if the user selects to erase the data. Furthermore, configuration may also be taken such that the user is allowed to select a portion to be erased rather than erasing all of the data.

On the other hand, in a case where it is determined by the CPU 161 in step S218 that the memory device 166 mounted pre-shutdown was the non-volatile memory, the processing proceeds to step S220 and the CPU 161 obtains the hash value of the data stored in the main memory. Next the processing proceeds to step S221 and the CPU 161 reads in the information of "the pre-shutdown hash value" in the flash ROM 163. Then the processing proceeds to step S222, the CPU 161 compares the hash value obtained in step S220 to the pre-shutdown hash value read out in step S221, and determines whether or not they are the same, i.e., determines the existence or absence of a falsification of data. In a case where the hash values are determined to be equivalent, the processing proceeds to step S207 and normal activation processing is performed, but if they are determined not to be the same, the processing proceeds to step S223. The CPU 161 notifies and alerts the user, in step S223, that the data in the main memory is falsified from the pre-shutdown state, the processing proceeds to step S224, and the CPU 161 interrupts the activation processing.

By performing the above explained processing, changing of operation by a malicious third party rewriting a program or the like in the main memory when the power supply of the image forming apparatus is OFF, and a malicious third party reading of data stored in the main memory can be prevented.

Note that though explanation was given for the example of the DIMM in the first embodiment, the present invention is applicable to a memory module installed directly on a substrate or to a memory device and an SPD directly installed on a substrate.

The notification to the user in step S223 may be performed by displaying an image, a message, or the like, on the console unit 102, or configuration may be taken such that the notification is performed by causing an LED in the console unit 102, or the like, to blink, or by notifying using audio or an alerting sound from a speaker.

In the first embodiment, by changing the processing based on distinguishing of whether or not the mounted memory device 166 is the volatile memory, the security specification of the image forming apparatus 101 is maintained to an appropriate level. If the arrangement for not being able to execute inappropriate program in the image forming apparatus 101 is provided, the time required for an activation may be shortened by erasing only a part of the data in the main memory, rather than all of the data, in step S219.

If the arrangement for maintaining the security specification of the image forming apparatus 101 to an appropriate level and not being able to execute inappropriate processing in the image forming apparatus 101 is provided, the hash values obtained in step S215 and in step S220 and compared in step S222 may be obtained for a part of the data in the main memory. Also, configuration may be taken such that in a case where the result of the comparison in step S222 is that the hash values are the same, the time required for the activation processing is shortened by using the data stored in the memory device 166 as is in the activation processing in step S207.

[Second Embodiment]

Explanation was given in the above described first embodiment for fundamental processes from an activation of the image forming apparatus 101 upon powering on to a shut down upon powering off. However in a case where the image forming apparatus 101 has a power saving function, similar processing is required to be performed before transitioning to the power saving mode and after recovering from the power saving mode. Below, explanation will be given for a second embodiment for a case where the image forming apparatus 101 has a power saving function. Note that because the configuration of the image forming apparatus 101 according to the second embodiment is essentially the same as the image forming apparatus 101 according to the previously described first embodiment, explanation will be omitted.

Figure 3A:
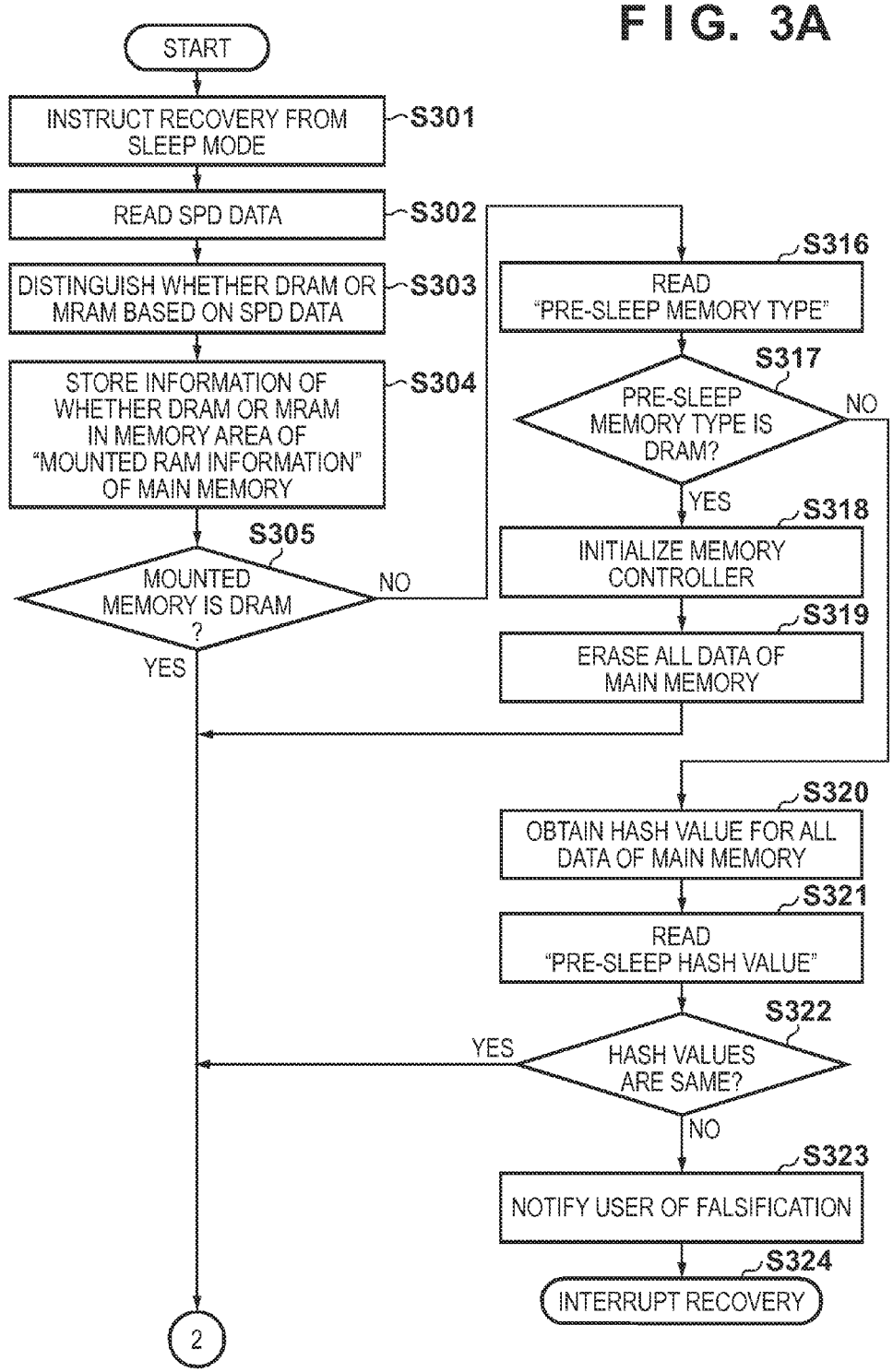

FIGS. 3A and 3B are flowcharts for describing the processing for cases where the image forming apparatus 101 according to the second embodiment of the present invention recovers from the sleep mode or where the image forming apparatus 101 according to the second embodiment of the present invention transitions to the sleep mode. Note that in the power saving mode, the power or the clock supply to a portion of the circuits of the image forming apparatus 101 is stopped and transition to a sleep mode is made.

Firstly the user makes an instruction for recovery from the sleep mode to the CPU 161 in step S301, the processing proceeds to step S302 and the CPU 161 reads in the SPD data from the flash ROM for SPD 167. Then the processing proceeds to step S303, the CPU 161 determines whether the mounted memory device 166 is the DRAM or the non-volatile memory such as the MRAM, based on the SPD data read out in step S302. Next the processing proceeds to step S304, the CPU 161 stores the determination result in step S303 to the memory area of "the mounted RAM information" of the main memory. Next the processing proceeds to step S305 and the CPU 161 determines whether or not the mounted memory device 166 is the DRAM, and if it is the processing proceeds to step S306 and the CPU 161 performs processing for recovering from the sleep mode and the CPU 161 transitions to normal operation in step S307.

Next the processing proceeds to step S308, and when there is an instruction for transition to the sleep mode from the user, the CPU 161 advances the processing to step S309. The CPU 161 copies and stores the information saved in the memory area of "the mounted RAM information" of the main memory to the area of "the pre-sleep memory type" of the flash ROM 163 in step S309. Next the CPU 161 determines whether or not the mounted the memory device 166 is the DRAM in step S310, and if so the processing proceeds to step S311 and the CPU 161 performs transition processing for transition to the sleep mode, and transition to the sleep mode is made in step S312.

On the other hand, if the CPU 161 determines that the mounted memory device 166 is the non-volatile memory such as the MRAM in step S310, the processing proceeds to step S313 and the CPU 161 erases the data that is stored in the main memory and that is required to be erased. Here, the data determined to be required to be erased may be, for example, personal information data, data received by the facsimile unit 105 via the telephone line 104, or data received from the PC 111 via the network 110. Next the processing proceeds to step S314, the CPU 161 obtains the hash value for all of the data of the main memory, the processing proceeds to step S315, and the CPU 161 stores the hash value to the area of "the pre-sleep hash value" in the flash ROM 163. Then the processing proceeds to step S311 and the CPU 161 performs transition processing for transitioning to the sleep mode.

In a case where the CPU 161 determines that the mounted memory device 166 is the non-volatile memory in step S305, the processing proceeds to step S316 and the CPU 161 reads in the information of "the pre-sleep memory type" in the flash ROM 163. Next the processing proceeds to step S317, the CPU 161 determines whether or not the memory type used before transition to the previous sleep mode was made was the DRAM, and if so the processing proceeds to step S318 and the CPU 161 initializes the memory controller 164 based on the SPD data. It becomes possible to use the memory device 166 as a main memory by the initialization.

However, there is the possibility that inappropriate data is remaining, so the CPU 161 erases all of the data stored in the main memory in step S319, and then the processing for recovering from the sleep mode in step S306 is performed.

Note that, in the second embodiment, configuration may be taken such that, for example, instead of erasing the data in the main memory unconditionally in step S319, a display is performed in order to prompt the user to make a selection of whether or not to erase the data, and all of the data in the main memory is erased only in a case where the user selects to erase the data. Furthermore, configuration may also be taken such that the user is allowed to select a portion to be erased rather than erasing all of the data of the main memory.

In a case where it is determined by the CPU 161 in step S317 that the mounted memory device 166 used before transition to the previous sleep mode is made is the non-volatile memory, the processing proceeds to step S320 and the CPU 161 obtains the hash value for all of the data in the main memory. Next the processing proceeds to step S321 and the CPU 161 reads in the information of "the pre-sleep hash value" in the flash ROM 163. Next the processing proceeds to step S322, the CPU 161 compares the hash value obtained in step S320 to the pre-sleep hash value read out in step S321 and determines whether or not they are the same. If it is determined that the hash values are equivalent, the processing proceeds to step S306 and the CPU 161 performs the processing for recovering from the sleep mode. On the other hand, when it is determined by the CPU 161 that the hash values are not the same in step S322, the processing proceeds to step S323 and the CPU 161 performs notification and warning of the user that the data in the main memory was falsified between the time of transition to the sleep mode and the time of recovery from the sleep mode. Then the processing proceeds to step S324 and the CPU 161 interrupts the processing for recovering from the sleep mode.

As explained above, a risk that a malicious third party will change the operation of the image forming apparatus 101 against the intent of the user when the image forming apparatus 101 is the sleep mode can be prevented by the second embodiment.

Note that though explanation was given for the example of the DIMM in the second embodiment, the present invention is applicable to a memory module installed directly on a substrate or to a memory device and an SPD directly installed on a substrate.

The notification to the user in step S323 may be performed by displaying an image or a message on the console unit 102, or causing an LED on the console unit 102, or the like, to blink. Alternatively, an operation notifying using sound or an alerting sound from a speaker may be used.

The time required for the recovery from the sleep mode may be shortened by erasing a portion of the data in the main memory in step S319 rather than all of the data. Furthermore, if an arrangement for maintaining the security specification of the image forming apparatus at appropriate level and not being able to execute inappropriate processes in the image forming apparatus is provided, the hash values obtained in step S313 and in step S320 and compared in step S322 may be for only a part of the area in the main memory. In a case where the result of the comparison in step S322 is that the hash values are the same, optimization of the processing for recovering from the sleep mode may be realized by using the data stored in the memory device 166 as is in the processing for recovering from the sleep mode in step S306.

Explanation is given having a transition to the sleep mode or a recovery from the sleep mode depend on an instruction from a user in the explanation of the second embodiment, but neither the transition to the sleep mode nor the recovery from the sleep mode is limited to depending on an instruction from a user. For example, instead of an instruction from a user, an instruction based on a timer by a timer circuit may be used.

[Third Embodiment]

Explanation was given based on operational state transition of the image forming apparatus 101 in the above described first embodiment and second embodiments, but in addition to this avoiding a malicious third party performing processing upon one of the operational state transitions of the image forming apparatus 101 can also be considered. For example, a third party may turn off the power supply of the image forming apparatus 101 and disassembles the apparatus, and replace the main memory of the image forming apparatus 101 with a non-volatile memory. Then, after the power supply of the image forming apparatus 101 is turned on, and the image forming apparatus 101 is made to operate momentarily, a power supply of the image forming apparatus is disconnected from a base so that normally performed shutdown processing is not executed. Such a case can be considered.

In the above described first embodiment and second embodiment, the processing is changed by determining whether or not the mounted memory device is a volatile memory in a case of an operational state transition. For this reason, if the operation described above is performed, the data stored on the main memory will be left unchanged and the data will be attainable by the third party. Explanation will be given for a third embodiment in which, in order to avoid such risk, the processing is changed based on a distinguishing of whether or not the mounted memory device is the volatile memory, even in the normal operational state. Note that the configuration of the image forming apparatus 101 according to the third embodiment is essentially the same as that of the image forming apparatus 101 according to the previously described first embodiment, so explanation will be omitted.

FIG. 4 is a flowchart for describing processing of the image forming apparatus 101 according to the third embodiment of the present invention. This processing makes up a portion of the normal operation processing of step S208 in FIG. 2B and step S307 in FIG. 3B. Here, in order that data is not left in the main memory even in a case where the power supply of the image forming apparatus 101 is disconnected from the base, the normal operation state processing is changed based on a distinguishing of whether or not the mounted memory device 166 is the volatile memory.

This processing is initiated by the normal operation processing of step S208 in FIG. 2B or step S307 in FIG. 3B being initiated.

First, in step S401, the CPU 161 initiates a print job receiving thread. When the normal operation of step S208 in FIG. 2B or step S307 in FIG. 3B is completed, the processing proceeds to step S412 due to a stop request of the print job receiving thread being received in step S402, and the CPU 161 stops the print job receiving thread. On the other hand in step S402 in a case where there is no print job receiving thread stop request, the processing proceeds to step S403, the print job receiving thread operating on the CPU 161 waits for a print job transmitted by the PC 111 via the network 110, and the processing proceeds to step S404. If a print job is received in step S404, the processing proceeds to step S405. In step S405, the print job receiving thread determines whether or not the received print job is a secure print job which holds a job without printing on a sheet until a user instructs the print out using the console unit 102 on the image forming apparatus 101. In a case where the received print job is not the secure print job, the processing proceeds to step S411, the printing is executed and the processing proceeds to step S403.

On the other hand, if the job is determined to be the secure print job in step S405, the processing proceeds to step S406, the print job receiving thread determines whether the mounted memory device 166 is the DRAM or the non-volatile memory such as the MRAM. Here if it is determined that the mounted memory device 166 is a non-volatile memory, the processing proceeds to step S407. In step S407 the CPU 161 makes a notification of a secure print job warning, i.e. a warning that receiving secure print jobs is dangerous because the mounted main memory is a non-volatile memory, to the PC 111 which is the print job dispatch origin. With this, the PC 111 which received the warning displays and warn to the user that "the mounted main memory in the image forming apparatus 101 is a non-volatile memory, so the secure print job input has a risk". Next the processing proceeds to step S408, and in a case where the CPU 161 receives a notification from the PC 111 that the user of the PC 111 instructs the execution of a secure print job in spite of the risk, the processing proceeds to step S409 from step S408. In a case where there is no notification that the user instructs the execution of the secure print job using the PC 111 in step S408, the processing returns to step S403.

In step S409, the CPU 161 stores the print job received from the PC 111 in the main memory, and the processing proceeds to step S410. In step S410, the CPU 161 waits for a user to input a print instruction via the console unit 102 of the image forming apparatus 101. In a case where the print instruction is input, the processing proceeds to step S411 and the CPU 161 prints an image on a sheet in accordance with the print job stored in the main memory. Then the processing proceeds to step S403 and the print job receiving thread waits for a print job from the PC 111 via the network 110.

The third embodiment is characterized by the processing being changed based on a distinguishing of whether or not the mounted memory device 166 is the volatile memory, and this embodiment is valid not only in a case where the PC 111 that transmitted the print job performs processing upon reception of a secure print job warning notification. For example, configuration may be taken such that a printer driver on the PC 111 displays the error message, "the secure print job is interrupted because the mounted main memory in the image forming apparatus 101 is a non-volatile memory" and discards the print job. Alternatively, the printer driver may transmit the print job to another image forming apparatus connected to the network 110.

The processing proceeds to step S409 if it is determined in step S406 that the memory of the mounted main memory is the DRAM, the received print job is stored on the main memory, and the processing proceeds to step S410.

Note, when it is determined that the job is not the secure print job in step S405, the processing proceeds to step S411, the print processing is executed in accordance with the received print job, the processing proceeds to step S403, and the print job receiving thread waits for the print job transmitted from the PC 111.

As explained above, by the third embodiment, the risk that a malicious third party replaces the main memory of the image forming apparatus with a non-volatile memory and the job data is extracted in between receiving the secure print job and the printing being executed can be prevented.

The third embodiment is characterized in that the processing is changed based on a distinguishing of whether or not the mounted memory device 166 is the volatile memory. If the arrangement for maintaining the security specification of the image forming apparatus 101 to an appropriate level and not being able to execute inappropriate processing in the image forming apparatus 101 is provided, the embodiment is applicable to other normal operation processing. For example, in a case where the mounted memory device 166 is a non-volatile memory such as the MRAM, if a facsimile reception thread of the facsimile unit 105 receives a call via the telephone line 104, configuration may be taken such that the call can be rejected. In a case where a telephone number is inputted using the console unit 102 in order to transmit a facsimile, the message, "currently the mounted memory is replaced with a non-volatile memory, so transition to the telephone number input screen is prohibited" may be displayed on the console unit 102 and the input may be rejected. In a case where the mounted memory device 166 is a non-volatile memory, image data scanned by the scanner 103 is held even if the power supply is turned off. Therefore, in such a case, an error message, "currently the mounted memory is replaced with a non-volatile memory, so a scanner function is not available" may be displayed on the console unit 102. Configuration may be taken such that in a case where the image forming apparatus 101 comprises a USB terminal, and has printing capabilities for printing from a USB memory, the print may be prohibited for the reason that the main memory is the non-volatile memory.

[Fourth Embodiment]

In the above described first through third embodiments, explanation is given for a case where either a volatile memory or a non-volatile memory is mounted as the main memory of the image forming apparatus 101. However, the present embodiment is characterized in that the processing is changed based on a distinguishing of whether or not the mounted memory device 166 is a volatile memory, and this embodiment is also valid in a case where both a volatile memory and the non-volatile memory functioning as the main memory for the image forming apparatus 101 are installed. For example, the situation where the memory controller 164 of the image forming apparatus 101 according to the fourth embodiment is able to connect to a plurality of memory modules 165 is considered. Here, this embodiment is also valid in a case where the memory devices 166 mounted on a portion of the memory modules is the DRAM, and the memory devices 166 mounted on the remaining the memory modules are the non-volatile memory. In such a case, for example, in step S407, instead of notifying the PC 111 which is the print job dispatch origin of a rejection of the secure print job, the processing can be altered to store the data of the secure print job on only the areas of the volatile memories.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)TM), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-231437, filed Nov. 7, 2013, which is hereby incorporated by reference herein in its entirety.

What is claimed is:

1. An image forming apparatus having a first memory to store a print job, the image forming apparatus comprising:
at least one processor; and
a second memory having instructions stored thereon, which when executed by the least one processor, cause the at least one processor to:
determine whether the first memory is a non-volatile memory or a volatile memory;
a storage memory configured to store a result of the determination in a non-volatile manner,
erase a data stored in the first memory in accordance with an event that causes the image forming apparatus to transition into a power off state or a power saving state, in a case where it is determined that the first memory is the non-volatile memory;
cause the image forming apparatus to transition to the power off state or the power saving state after the data stored in the first memory is erased in the case where it is determined that the first memory is the non-volatile memory,
receive an instruction to instruct the image forming apparatus to hold the print job in the first memory until the print job is instructed to print; and
output a message indicating that the print job is to be kept in the first memory in a case where the image forming apparatus receives the instruction and it is determined that the first memory is the non-volatile memory, and not output the message in the case where the image forming apparatus receives the instruction and it is determined that the first memory is the volatile memory.

2. The image forming apparatus according to claim 1, further comprising:
the storage memory configured to store the result of the determination in the non- volatile manner, wherein the second memory has further instructions stored thereon, which when executed by the at least one processor, cause the at least one processor to:
distinguish an existence or absence of a falsification of the data of the first memory in a case where, upon a powering on or a recovery from the power saving state, the result of the determination stored in the storage memory is that the first memory is the non-volatile memory; and
interrupt an activation of the image forming apparatus in case where it is determined that there is the falsification of the data.

3. The image forming apparatus according to claim 2, wherein the second memory has further instructions stored thereon, which when executed by the at least one processor, cause the at least one processor to warn a user when it is distinguished that there is the falsification of the data.

4. The image forming apparatus according to claim 2, wherein the second memory has further instructions stored thereon, which when executed by the at least one processor, cause the at least one processor to distinguish that there is the falsification of the data of the first memory when a hash value of the data of the first memory for when powering off which is stored in the non-volatile manner, and the hash value of the data of the first memory for when the powering on or the recovering from the power saving state are not the same.

5. The image forming apparatus according to claim 2, wherein the second memory has further instructions stored thereon, which when executed by the at least one processor, cause the at least one processor to cause the image forming apparatus to activate, omitting a loading of a program into the first memory when it is distinguished that there is not the falsification of the data upon the powering on.

6. The image forming apparatus according to claim 1, further comprising:
the storage memory configured to store the result of the determination by the determination unit in the non-volatile manner, wherein the second memory has further instructions stored thereon, which when executed by the at least one processor, cause the at least one processor to erase the data of the first memory in a case where, upon powering on or recovery from the power saving state, the result of the determination stored in the storage memory is that the first memory is the volatile memory.

7. The image forming apparatus according to claim 1, wherein the second memory has further instructions stored thereon, which when executed by the at least one processor, cause the at least one processor to erase personal information stored in the first memory or received data.

8. A method of controlling an image forming apparatus having a first memory to store a print job, the method comprising:
determining whether the first memory is a non-volatile memory or a volatile memory;
storing, by a storage memory, a result of the determination in a non-volatile manner,
erasing a data stored in the first memory in accordance with an event that causes the image forming apparatus to transition into a powered off state or a power saving state in a case where it is determined that the first memory is the non-volatile memory;
causing the image forming apparatus to transition to the power off state or the power saving state after the data stored in the first memory has been erased in the case where it is determined that the first memory is the non-volatile memory;

receiving an instruction to instruct the image forming apparatus to hold the print job in the first memory until the print job is instructed to print; and outputting a message indicating that the print job is to be kept in the first memory in a case where the image forming apparatus receives the instruction and it is determined that the first memory is the non-volatile memory, and not outputting the message in the case where the image forming apparatus receives the instruction and it is determined that the first memory is the volatile memory.

9. A non-transitory computer-readable storage medium storing a program for causing a computer to control functions of an image forming apparatus having a first memory to store a print job, the image forming apparatus comprising:

at least one processor; and a second memory having instructions stored thereon, which when executed by the at least one processor, cause the at least one processor to:

determine whether the first memory is a non-volatile memory or a volatile memory;

storing, by a storage memory, a result of the determination in a non-volatile manner, erase a data stored in the first memory in accordance with an event that causes the image forming apparatus to transition into a power off state or a power saving state in a case where it is determined that the first memory is the non-volatile memory;

cause the image forming apparatus to transition to the power off state or the power saving state after the data stored in the first memory has been erased in the case where it is determined that the first memory is the non-volatile memory;

receive an instruction to instruct the image forming apparatus to hold the print job in the first memory until the print job is instructed to print; and output a message indicating that the print job is to be kept in the first memory in a case where the image forming apparatus receives the instruction and it is determined that the first memory is the non-volatile memory, and not output the message in the case where the image forming apparatus receives the instruction and it is determined that the first memory is the volatile memory.

* * * * *